United States Patent Office
3,740,433
Patented June 19, 1973

3,740,433
ANTI-ANXIETY COMPOSITION AND
METHOD OF USE
Donald E. Clody, Somerset, Bernard Beer, Princeton,
John Vogel, South Bound Brook, and Zola P. Horovitz,
East Brunswick, N.J., assignors to E. R. Squibb & Sons,
Inc., Princeton, N.J.
No Drawing. Filed Oct. 1, 1971, Ser. No. 185,822
Int. Cl. A61k 27/00
U.S. Cl. 424—253
9 Claims

ABSTRACT OF THE DISCLOSURE

Disclosed herein is a composition of a pharmaceutically acceptable carrier and a xanthine-type moiety which has been found to have significant anti-anxiety activity.

SUMMARY OF INVENTION

The present invention relates to a composition of a compound having moiety of formula

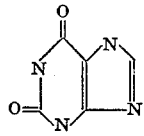

and a pharmaceutical carrier which when administered has anti-anxiety activity and a method of utilizing this composition as an anti-anxiety agent.

DESCRIPTION OF INVENTION

It has been discovered that compounds having a formula

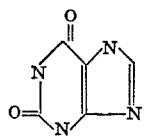

when administered to animals or humans greatly reduces their anxiety reactions.

It has been further discovered that xanthines of the structure of Formula I above and more particularly compounds of Formula II

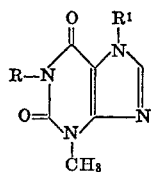

where R and $R^1$ are lower alkane, such as 1,3-dimethylxanthine, 3,7-dimethylxanthine, 1,3,7-tri-methylxanthine, give the desired results.

The compositions of this invention can be formulated in various forms, either tablet, solutions for intraperitoneal injection, or elixir. It is to be understood that the active ingredients of this invention can be formulated as follows: the xanthine moiety should be present in from about .3 mg./kg. of body weight to 10.0 mg./kg. of body weight with the preferred range from 1.5 mg./kg. of body weight to about 5.0 mg./kg. of body weight.

Suitable carrier materials include, for example, water, gelatin, gum arabic, lactose, starches, magnesium stearate, talc, vegetable oils, polyalkyleneglycols, petroleum jelly, etc. The pharmaceutical preparations can be submitted in solid form (e.g. as tablets, dragées, suppositories, capsules); in semi-solid form (e.g., as salves) or in liquid-form (e.g., as solutions, suspensions or emulsions). They may be sterilized and/or contain additives such as preserving, stabilizing, wetting or emulsifying agents, salts for varying the osmotic pressure or buffers. The aforesaid preparations may further be compounded with other therapeutically valuable substances such as other compounds having antibacterial activity.

The term lower alkyl when utilized means an alkyl of from 1 to 6 carbon, e.g., methyl, ethyl, propyl, isopropyl, 2-methylheptyl, t-butyl and so forth.

METHOD

The test utilized in determining the activity of the compositions of this invention is as follows ("A Simple and Reliable Conflict Procedure for Testing Anti-Anxiety Agents," J. R. Vogel, B. Beer, and D. E. Clody; Psychopharmacologia 21:1971):

Forty naive adult male Holtzman rats (approximately 170 g.) are randomly divided into five groups and deprived of water for 48 hours prior to the test session. Food is available in the home cage at all times.

The apparatus is clear Plexiglas box (38 x 38 cm.) with a black Plexiglas compartment (10 x 10.5 cm.) attached to one wall. An opening (5 x 7.5 cm.) leads from the large box to the small compartment. The entire apparatus has a stainless-steel grid floor. A water bottle with a metal drinking tube is fitted to the outside of the small compartment, so that the tube extended 2 cm. (through a 1-cm. hole) into the box at a height of 3 cm. above the grid. A drinkometer circuit is connected between the drinking tube and the grid floor of the appaartus, so that the subject completed the circuit whenever it licked the tube. The apparatus was placed in a quiet area of the laboratory.

Various experiments have indicated that rats lick in bursts, and that lick rate within a brust is relatively constant at about seven licks per second. Because subjects frequently extend the mouth over the tube while licking (thereby locking up the drinkometer circuit), it is difficult to measure the number of licks. To provide a reliable measure of consummatory behavior, the drinkometer was connected to a circuit that produced seven pulses per second whenever the subject was in contact with the tube. Each pulse was counted as equivalent to one lick.

Shock is administered to each subject by switching the connections to the drinking tube and grids from the drinkometer to a Grasion-Stadler Shocker (Model E1064GS) set at 0.5 ma. Thus, unscrambled shock was applied between the drinking tube and grid floor.

Thirty minutes after intraperitoneal injection, each subject is placed in the apparatus. Subject is allowed to find the drinking tube and complete 20 licks before shock (available at the tube for 2 seconds) is administered. The subject controlled shock duration by withdrawing from the tube. A 3-minute timer is automatically started at the termination of the first shock. During the 3-minute period, shocks are delivered following each twentieth lick. The number of shocks delivered during the 3-minute session is recorded for each subject. Because the primary interest in the effects of drugs on behavior that is suppressed by punishment, and since motivation under the deprivation conditions imposed in this procedure are maximum, non-shocked animals are not included in these experiments.

Drugs are prepared as solutions in distilled water or suspensions in agar so that each cubic centimeter contained 1 kg. of body weight dosage. All statistical comparisons were made using Mann-Whitney U test (two-tailed).

The following examples are illustrative of this invention. All degrees are in centigrade unless otherwise stated.

EXAMPLE 1

Following the procedure set forth in the method above 1,3-dimethylxanthine was utilized and the test results as set forth in Table I with saline as a control shows this compound has anti-anxiety activity as the injected animal could withstand a significant number of shocks.*

TABLE I

| | 1,3-dimethylxanthine dose, mg./kg. | | | |
|---|---|---|---|---|
| | Saline | 50 | 75 | 100 |
| Mean number of shocks | 4.4 | 4.9 | *6.7 | *15.7 |

EXAMPLE 2

Following the procedure of the method and utilizing 1,3,7-trimethylxanthine, a significant response was recorded as shown in Table II.

TABLE II

| | 1,3,7,-trimethylxanthine dose, mg./kg. | | | |
|---|---|---|---|---|
| | Saline | 25 | 50 | 100 |
| Mean number of shocks | 1.25 | 3.5 | *9.6 | 2.0 |

What is claimed is:

1. A method of preventing anxiety which comprises treating a patient suffering from anxiety with a composition of from 0.3 mg./kg. of body weight to about 10.0 mg./kg. of body weight of a compound of the formula selected from the group consisting of

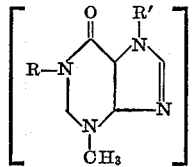

1,3-dimethylxanthine, 3,7-dimethylxanthine and 1,3,7-trimethylxanthine and a pharmaceutically acceptable carrier.

2. A method in accordance with claim 1 wherein the compound having the moiety of claim 1 is 1,3-dimethylxanthine.

3. A method of preventing anxiety in accordance with claim 1 wherein the moiety is 3,7-dimethylxanthine.

4. A method of treating anxiety as in accordance with claim 1 wherein the moiety is 1,3,7-tri-methylxanthine.

5. A method of preventing anxiety in accordance with claim 1 wherein from about 0.3 mg./kg. of body weight to about 10.0 mg./kg. of body weight of the active moiety is present in the composition.

6. A method in accordance with claim 2 wherein from about 0.3 mg./kg. of body weight to about 10.0 mg./kg. of body weight is the active moiety present in the composition.

7. A method in accordance with claim 3 wherein from about 0.3 mg./kg. of body weight to about 10.0 mg./kg. of body weight is the active moiety present in the composition.

8. A method in accordance with claim 4 wherein from about 0.3 mg./kg. of body weight to about 10.0 mg./kg. of body weight is the active moiety present in the composition.

9. A method of preventing anxiety which comprises treating a patient suffering from anxiety with a composition of from 0.3 mg./kg. of body weight to about 10.0 mg./kg. of body weight of a compound of the formula:

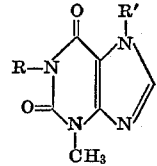

wherein R and R' are lower alkane and a pharmaceutically acceptable carrier.

References Cited

UNITED STATES PATENTS 3,624,215   11/1971   Stein _____ 424—253

OTHER REFERENCES

Vogl: Diuretic Therapy (1953), pp. 45–46.
Merck Index, 7th ed. (1960), p. 1030.

STANLEY J. FRIEDMAN, Primary Examiner